(12) United States Patent
Barth et al.

(10) Patent No.: US 6,386,219 B1
(45) Date of Patent: May 14, 2002

(54) FLUID HANDLING SYSTEM AND METHOD OF MANUFACTURE

(75) Inventors: Phillip W. Barth, Portola Valley; Reid Alyn Brennen, San Francisco, both of CA (US)

(73) Assignee: Agilent Technologies, Inc., Palo Alto, CA (US)

(*) Notice: Subject to any disclaimer, the term of this patent is extended or adjusted under 35 U.S.C. 154(b) by 0 days.

(21) Appl. No.: 09/775,722

(22) Filed: Feb. 1, 2001

(51) Int. Cl.[7] .............................................. F16K 27/00
(52) U.S. Cl. ...................... 137/15.01; 137/597; 137/606
(58) Field of Search ................... 137/606, 597, 137/607, 15.01

(56) References Cited

U.S. PATENT DOCUMENTS 5,091,258 A * 2/1992 Moran ......................... 428/141
5,123,443 A * 6/1992 Garrison .................. 137/565.15
5,325,889 A * 7/1994 Paul et al. .................... 137/594
5,846,396 A * 12/1998 Zanzuchi et al. ............ 204/601
5,932,799 A    8/1999 Moles ......................... 73/53.01

FOREIGN PATENT DOCUMENTS

WO    WO 99/55461    11/1999    ............ B01L/3/02

* cited by examiner

Primary Examiner—Stephen M. Hepperle

(57) ABSTRACT

A fluid handling system, and a method of manufacture therefor, is provided having a flexible manifold including two layers of flexible material laminated together. The flexible manifold has provided therein a covered capillary, a capillary inlet hole fluidically connected to the covered capillary, and a capillary outlet hole fluidically connected to the covered capillary. A peripheral rim is attached to the flexible manifold and exerts tensile stress on the flexible manifold to provide dimensional stability to the flexible manifold.

33 Claims, 3 Drawing Sheets

FLUID HANDLING SYSTEM AND METHOD OF MANUFACTURE

CROSS-REFERENCE TO RELATED APPLICATION(S)

This application is related to U.S. application Ser. No. 09/150,507, concurrently pending, titled "MULTIPLE RESERVOIR APPARATUS FOR FABRICATION OF BIOMOLECULAR ARRAYS", hereby incorporated herein by reference in its entirety.

TECHNICAL FIELD

The present invention relates to fluid handling systems and, particularly, to methods and apparatus for depositing biological materials in a pattern of array features on a surface of a solid support.

BACKGROUND ART

Chemical and biological research, development, and manufacturing, in fields such as combinatorial chemistry, genomics, and proteomics, often requires the simultaneous handling of small quantities of many different fluids including gases and liquids. Gases can often be handled easily using tubing and manifolds, but liquid handling is often difficult.

Liquid samples are often handled and stored in microtiter plates. Microtiter plates are rectangular trays made of glass or plastic. They contain many small liquid reservoirs adjacent to one another for reacting and storing liquids in typical arrays sizes of 96 in an 8×12 array of 400 microliter ($\mu$l) wells on 9 millimeter (mm) spacing, 384 in a 16×24 array of 100 $\mu$l wells on 4.5 mm spacing, or 1536 in a 32×48 array of 10 $\mu$l wells on 2.25 mm spacing. Transferring the many liquid samples from microtiter plates to other formats such as microarrays presents many challenges.

Microarrays of binding agents have become an increasingly important tool in the biotechnology industry and related fields. Such arrays, in which such binding agents as oligonucleotides or peptides are deposited onto a solid support surface in the form of an array or pattern, can be useful in a variety of applications, including gene expression analysis, drug screening, nucleic acid sequencing, mutation analysis, and the like.

Such arrays may be prepared in any of a variety of different ways, many of which rely on transferring liquids from an array of liquid samples in one or more microtiter plates to the substrate on which the microarray is formed. For example, DNA arrays may be prepared manually by spotting DNA onto the surface of a substrate with a micropipette. Or, a dot-blot approach or a slot-blot approach may be employed in which a vacuum manifold transfers aqueous DNA samples from a plurality of reservoirs to a substrate surface. Or, an array of pins can be dipped into an array of fluid samples and then contacted with the substrate surface to produce the array of sample materials. Or, an array of capillaries can be used to produce biopolymeric arrays.

In an alternative approach, arrays of biopolymeric agents are constructed in discrete regions on the surface of the substrate.

There is a continued interest in developing methods and devices for making arrays of biomolecules, in which the apparatus is less complicated and more automated and the methods reduce waste of biological material that may be in limited supply, and which result in efficient and reproducible rapid production of more versatile and reliable arrays.

Inkjet printing devices have been modified and used to dispense biochemical agents such as proteins and nucleic acids but have not been able to achieve a spatial density of liquid samples at the inkjet head comparable to the spatial density of ink ejection orifices on the head itself. Thus, even though the orifices on an inkjet head may be spaced less than 100 micrometers ($\mu$m) apart from one another, the spacing of different liquid samples feeding such a head has not been reduced to less than millimeters (mm).

Recent art taught in international patent application WO9955461(A1) discloses a redrawn capillary imaging reservoir which may be used for pin-printing of liquid samples onto a microarray and which also may be used in transferring liquid samples between microtiter plates of different well density. However, the art taught in that patent application results in relatively large volumes of liquid required to fill the capillary system taught therein. Since the liquid samples used for microarray fabrication are often scarce and expensive, the requirement for large filling volumes can create problems is practicing that art.

Thus there still exists a need for a droplet deposition system which is fed from hundred of different reservoirs, which can deposit hundreds of different fluids in the form of drop-on-demand droplets onto substrates for purposes such as microarray fabrication, and

DISCLOSURE OF THE INVENTION

The present invention provides a fluid handling system, and a method of manufacture therefor, having a flexible manifold including two layers of flexible material laminated together. The flexible manifold has provided therein a capillary, a capillary inlet hole fluidically connected to the capillary, and a capillary outlet hole fluidically connected to the capillary. A peripheral rim is attached to the flexible manifold and exerts tensile stress on the flexible manifold to provide dimensional stability to the flexible manifold.

The present invention further provides a fluid handling system allowing hundreds of different liquids to supply an edge-fed, drop-on-demand, face-shooting, thermally-actuated "deposition chip" from a supply region comprising hundreds of reservoirs wherein each reservoir has a volume on the order of microliters. The deposition chip is a modified silicon inkjet chip placed upon a stretched microfluidic structure called a "format compression manifold" (FCM). The FCM contains hundreds of capillaries, orifices, and feedthrough holes which allow fluidic transfer of hundreds of different liquid samples from the format spacing of several millimeters, as typically used in microtiter plates, to a format spacing of tens of micrometers, as typically used in inkjet orifices originally developed for printing with ink on paper. The deposition chip then spits each of the hundreds of different liquids as individual droplets with a volume on the order of picoliters, in a drop-on-demand mode, onto substrates such as glass plates. Such plates can comprise microarrays such as DNA microarrays or protein microarrays which can contain thousands of different spots of thousands of different biological samples. The FCM is provided with dimensional stability by being stretched like a drumhead on a rigid frame called the "rim."

An additional plate known as a microtiter manifold (MTM) is adhesively bonded over inlet holes at the ends of the FCM capillaries distal from the deposition chip. The MTM contains hundreds of liquid reservoirs laterally spaced on centers of several millimeters, with each reservoir being in fluid communication with one capillary of the FCM. In variations of this embodiment, multiple MTMs may be bonded onto the FCM and multiple deposition chips may be bonded onto the FCM.

In a second embodiment of the present invention the MTM and the rim form one contiguous body which is adhesively bonded to the openings of the FCM capillaries distal from the deposition chip, which contiguous body contains the hundreds of liquid reservoirs, and which acts to keep the FCM stretched for dimensional stability. In a third embodiment of the present invention a separate microtiter plate is mechanically clamped in place to align it to inlet holes of the FCM capillaries distal from the deposition chip, such that each reservoir of the microtiter plate is in fluid communication with one capillary of the FCM. Gasketing between the microtiter plate and the FCM prevents cross-leakage between the reservoirs of the microtiter plate. In variations of this embodiment, multiple microtiter plates may be clamped onto the FCM, and multiple deposition chips may be bonded onto the FCM.

An advantage of the present invention is that it takes separate fluid samples, which are initially loaded into reservoirs, which are laterally spaced several millimeters apart, and decreases the spacing between the separate samples to tens of micrometers before the samples are spit onto substrates where the desired spacing between samples is also tens of micrometers. This decrease in spacing is called "format compression", and is expressed in a figure of merit called the format compression ratio (FCR). For example, in one embodiment of the invention the lateral spacing between samples when loaded into reservoirs is 2.25 mm, while the lateral spacing between samples at the deposition chip is reduced to 84.7 um. The FCR is thus 2.25 mm=2250 um divided by 84.7 um, which is equal to 26.6. When the rows of the firing chambers along opposite lateral edges of the deposition chip are offset from one another, either by chip design or by slightly rotating the deposition chip with respect to the substrate on which it is to deposit spots, the FCR can be doubled to 53. This permits the correspondence of one reservoir to one firing chamber at spacings, which have not been achievable with prior technology.

Another advantage of the invention is minimal priming volume. The multiple incoming liquid samples can be expensive, and when large volumes of such samples are required in order to prime a deposition system before its use, then deposition costs rise correspondingly. The present invention minimizes the priming volume and so keeps deposition costs low. Typical priming volumes for the present invention are in the range of 100 nanoliters (nl) to 400 nl.

Further, when incoming samples arrive at the manufacturing site in industry-standard load formats such as those of a 96-well microtiter plate, a 384-well microtiter plate, or a 1536- well microtiter plate, cost savings arise when the handling expense of transferring the incoming samples to the fluid handling system is minimized. When an incoming microtiter plate can be loaded directly into the fluid handling system through a specialized filter plate without first removing the many incoming samples from the microtiter plate, the load format compatibility is maximized as in the present invention.

Another advantage of the invention is dimensional stability. Despite being constructed using a flexible polymer which tends to undergo shrinkage during fabrication, the present invention achieves dimensional stability by stretching the rigid polymer, during fabrication, on a rigid frame. The polymer stretched on the frame attempts to shrink, but its shrinkage is prevented by the rigid frame, and the result is a structure in which the polymer is stretched like a drumhead, so that in addition to dimensional stability in the plane of the polymer, the tautness of the stretched polymer provides stability perpendicular to the plane of the polymer. Dimensional stability in all three physical directions allows both precision in placing the deposition chip on the FCM in relation to ejection orifices machined into the FCM and precision in deposition of droplets onto substrates.

Further, the peripheral rim in the present invention, like the rim of a drumhead, serves to keep the flexible format compression manifold flat and taut. However, unlike a drumhead, the FCM need not be flat and taut everywhere, and instead may have external hanging flaps, internal hanging flaps, and unrestrained internal portions. The rim around the FCM need not extend completely around the FCM periphery, nor need it extend completely around any MTM on the FCM. The rim needs only to extend far enough around an area where tautness is desired to keep that area taut. Cutout regions and unrestrained flaps can be created in the FCM either before or after the layers of the FCM are laminated to the rim. The rim may be split, either before or after lamination, into more than one portion.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
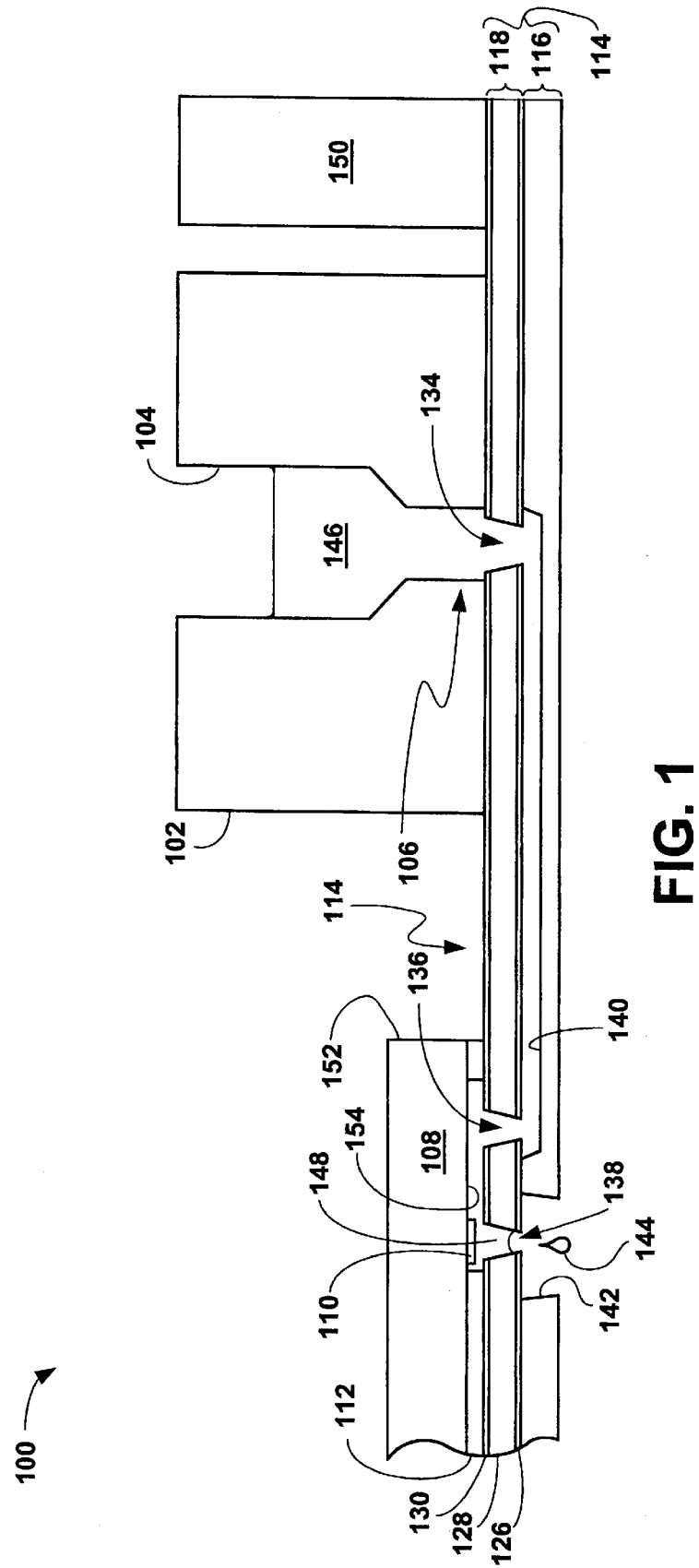
FIG. 1 is a cross-sectional view of a portion of a fluid handling system of an embodiment of the present invention.

FIG. 1 shows a cross-sectional view of a portion of a fluid handling system 100 for handling fluids such as gases, plasmas, and liquids. The fluid handling system 100 includes a microtiter manifold (MTM) 102 made of a rigid material, such as stainless steel. The MTM 102 has a reservoir 104 provided therein. Reservoir 104 is optionally provided with a neck portion 106 at the downstream end.

The fluid handling system 100 further includes a deposition chip 108, which carries ejection means 110 and a barrier 112.

A format compression manifold (FCM) 114 is bonded to the MTM 102 and the barrier 112. The FCM 114 consists of a first sheet 116 bonded to a second sheet 118. The first and second sheets 116 and 118, respectively, could be high strength metal foils bonded by adhesive or single sheets of self-adhesive polymers, but in one preferred embodiment layer 116 is a sheet of non-adhesive polyimide such as Kapton HN available from E. I. DuPont de Nemours of Wilmington, Del. Layer 118 is a trilayer laminate with a polyimide core and thermoplastic adhesive polyimide outer layers. An example of such a trilayered material is Kapton HKJ, also available from E. I. DuPont de Nemours of Wilmington, Del. Thus, the second sheet 118 has an adhesive layer 126, a core 128, and an adhesive layer 130.

The second sheet 118 has various openings, including liquid access holes 134 and 136 and an orifice 138, provided therein. The liquid access holes 134 and 136, and the orifice 138 are generally laser ablated into the second sheet 118. In a similar manner, a capillary 140 is laser ablated into the first sheet 116 so as to connect the liquid access holes 134 and 136 when the first and second sheets 116 and 118 are properly aligned. Passthrough hole 142 is also laser ablated into sheet 116.

In operation, a droplet 144, which has a typical volume of 35 picoliters (pl), is ejected from the fluid handling system 100 through droplet passthrough hole 142 after being ejected from the orifice 138 by ejection means 110. The ejection means 110 is typically an electrically heated resistor, which acts by explosive boiling of a liquid 146 to eject the droplet 144, although other ejection means such as piezoelectric means may also be used. After ejection of the droplet 144, it flies through space and is deposited on a substrate such as a glass slide (not shown) to form one sample point in a microarray (not shown).

The liquid 146 occupies a continuous fluid path extending from reservoir 104, through the liquid access hole 134, through the capillary 140, and through liquid access hole 136 to a firing chamber 148. The firing chamber 148 is walled by the deposition chip 108 on its upper surface, by the barrier 112 on its sides, and by the sheet 118 on its bottom surface. The first and second sheets 116 and 118 together form the walls of the capillary 140 and are adhesively bonded together to create the FCM 114 containing hundreds of capillaries which are similar to the capillary 140, hundreds of droplet passthrough holes such as the droplet passthrough hole 142, hundreds of orifices such as the orifice 138, and hundreds of liquid access holes such as the liquid access holes 134 and 136. The FCM 114 is in a state of tensile stress on a rim 150 which encircles the FCM 114 and to which the second sheet 118 is adhesively bonded. The MTM 102 is secured to the FCM 114 and contains hundreds of fluid reservoirs such as reservoir 104, each of which is in fluid communicaton with a capillary on the FCM 114 such as capillary 140.

In the embodiment illustrated in FIG. 1, the FCM 114 is adhesively bonded to the rim 150 and is in a state of tensile stress on the rim 150. In a second embodiment, not shown, the MTM and the rim are combined in one contiguous body to which the FCM is bonded and on which it is in a state of tensile stress.

The barrier 112 forms a solid barrier against liquid flow between hundreds of firing chambers, which are the same as the firing chamber 148, which are laterally adjacent to one another, and which are all adjacent to the deposition chip 108 at surface 154.

Because the capillary 140 feeds liquid to the firing chamber 148 from a direction perpendicular to a lateral edge 152 of the deposition chip 108, the deposition chip 108 is referred to as "edge-fed". Because the droplet 144 is ejected perpendicular to a major face 154 of the deposition chip 108, the deposition chip 108 is also referred to as a "face-shooter" (alternatively, some practitioners of inkjet technology use the term "roof-shooter"). Because the reservoir 104 is remotely located from the edge 152 of the deposition chip 108, the arrangement is thus referred to as a "remote-reservoir, edge-fed, face-shooter".

Figure 2:
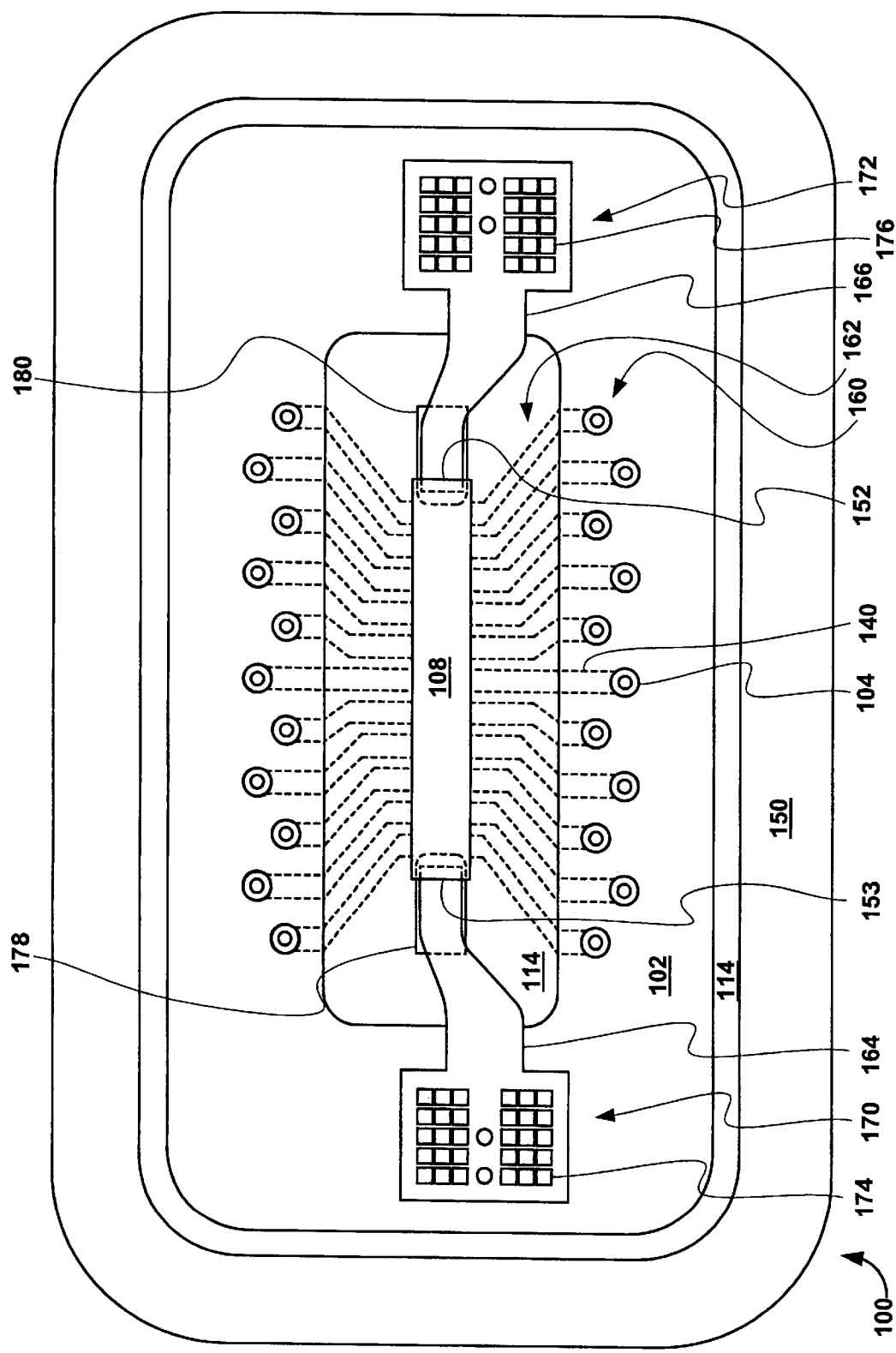
FIG. 2 is a plan view of the fluid handling system of one embodiment of the present invention.

Referring now to FIG. 2, therein is shown a plan view of the fluid handling system 100. It will be understood that the fluid handling system 100 is not to scale. For example, the reservoir 104 in the MTM 102 is only one of several hundred such reservoirs, which are designated as reservoirs 160. Similarly, the capillary 140 in the FCM 114 is one of several hundred capillaries designated as capillaries 162.

The fluid handling system 100 takes separate fluid samples, which are initially loaded into the reservoirs 160 which are laterally spaced several millimeters apart, and decreases the spacing between the separate samples to tens of micrometers before the samples are spit onto substrates where the desired spacing between samples is also tens of micrometers. This advantage is called format compression, and is expressed in a figure of merit called the format compression ratio (FCR). For example, in one embodiment of the invention, the lateral spacing between samples when loaded into reservoirs 2.25 mm, while the lateral spacing between samples at the deposition chip is reduced to 84.7 um. The FCR is thus 2.25 mm=2250 um divided by 84.7 um, which is equal to 26.6. When the firing chambers 148 along opposite lateral edges 152 and 153 of the deposition chip 108 are offset from one another, either by chip design or by slightly rotating the deposition chip 108 with respect to the substrate on which it is to deposit spots, the FCR can be doubled to 53.

In the best modes, it has been found that FCRs of 25 and greater, 50 and greater, 100 and greater, and 200 and greater are especially efficacious.

The reservoirs 160 are connected by the capillaries 162 to the deposition chip 108. The capillaries 162 are closer to one another proximate the deposition chip 108 than are reservoirs 160, showing format compression.

Further, it may be seen that the capillaries 162 can be manufactured to have extremely small internal volume so as to provide a minimal priming volume. The multiple incoming liquid samples can be expensive, and when large volumes of such samples are required in order to prime a deposition system before its use, then deposition costs rise correspondingly. The present invention minimizes the priming volume and so keeps deposition costs low. Capillaries with, for example, a width of 50 um and a depth of 20 um have a cross sectional area of $10^{-3}$ mm$^2$, so that they have a volume per unit length of ten nanoliters per centimeter (10 nl/cm). The fluid handling system 100 also has "load format compatibility", a concept which can be expressed in various figures of merit. Briefly, when incoming samples arrive at the manufacturing site in industry-standard load formats, for example in a 96-reservoir microtiter plate, a 384-reservoir microtiter plate, or a 1536-reservoir microtiter plate, cost savings arise when the handling expense of transferring the incoming samples to the overall deposition system is minimized. When an incoming microtiter plate can be loaded directly into the overall deposition system without first removing the many incoming samples from the microtiter plate, the load format compatibility is maximized as in the present invention.

Electrical flex leads 164 and 166 are connected to the deposition chip 108 at electrical bonding pads (not shown), which provide electrical connections to the several hundred ejection means 110. The electrical flex leads 164 and 166 are respectively connected at their other ends to bonding pad arrays 170 and 172 containing respective bonding pads such as bonding pads 174 and 176. The rim 150 supports the formant compression manifold 114 seen from the exposed major surface of the second sheet 118. The MTM 102 contains all of the reservoirs 160 and also provides mechanical support for the bonding pad arrays 170 and 172 on flex leads 164 and 166. Flex leads 164 and 166 pass respectively through holes 178 and 180 in FCM 114 to access the above-mentioned bonding pads on chip 108. The multi-liquid deposition system 100 is used in an overall deposition system (not shown), which applies signals to the bonding pads 174 and 176 to cause actuation of the ejection means 110.

In either the first or the second embodiment described above, the reservoirs in the MTM may be laid out in an array, which matches the array layout of a microtiter plate containing incoming samples. The microtiter plate can then be mated to the MTM and the entire load of the microtiter plate can be transferred to the MTM simultaneously. International patent application WO9955461(A1) teaches one method of accomplishing such a transfer. FIG. 11 of that publication, accompanying text on page 29 of that application, and claim 9 on page 32 of that application disclose using a microtiter plate having 96-wells with filters at the bottom of each well to load a transfer manifold in which channels of initially large cross section at an input plane taper to a smaller cross section at an output plane. The same or a similar loading method can be applied to loading the MTM of the present invention. In contrast to the invention described in international patent application WO9955461(A1), the present invention allows channels of uniform cross sectional area to extend from the input reservoirs to the output locations of the FCM, so that the volume required to fill each capillary in the FCM is minimized.

There are a number of steps involved in the manufacture of the FCM 114 of FIG. 1. The first sheet 116 is laser machined with the capillaries 162 and passthrough holes 142 for each of the capillaries 162. The second sheet 118 is laser machined with the liquid access holes 134 and 136, and the orifice 138 for each of the capillaries 162. To simplify manufacture, registration pins (not shown) or other alignment devices can be inserted through additional laser-ablated registration holes (not shown) and used to keep the various orifices and capillaries in proper alignment during subsequent lamination.

Lamination of the FCM layers and the rim is accomplished as follows. The FCM layers 116 and 118 are placed in contact with one another and layer 118 is placed in contact with rim 150. MTM 102 and chip 108 are absent from the FCM lamination process. A central plug, not shown, is placed within the rim so that it provides a backing plate for the exposed surface of layer 118. The central plug has a non-bonding flat surface such as Teflon or silver so that layer 118 will not adhesively bond to it. Pressure is applied to the exposed surface of layer 116 across a steel pressure-applying diaphragm using gas pressure. Optionally, a nonbonding surface of silver or Teflon may be on the steel pressure-applying diaphragm where it contacts the exposed surface of layer 116, or a nonbonding shim of a material such as Teflon may be placed between the steel pressure-applying diaphragm and the exposed surface of layer 116. All components are raised to a suitable bonding temperature.

DuPont recommends a 300° C. temperature and a 225 psi pressure for Kapton HN, but it has been determined that pressures as low as 40 psi will produce bonding.

When loaded into the lamination apparatus the first and second sheets 116 and 118 need not be in tension, and as they are raised to the lamination temperature they need not be in tension. As they cool from the lamination temperature to room temperature, the first and second sheets 116 and 118 tend to shrink to a certain extent, while the rim 150 shrinks to a lesser extent. Thus, when the laminated assembly returns to room temperature, the first and second sheets 116 and 118 are left in a state of tension in the two directions perpendicular to their thickness so that the first and second sheets 116 and 118 are flat and taut. MTM 102 can then be aligned and bonded to FCM 114 using either high temperature lamination or lower-temperature adhesives. In bonding MTM 102 to FCM 114 using high temperature lamination, care must be taken to avoid collapsing capillaries 162 where they pass under MTM 102. The preferred method of taking such care is to use a racetrack-shaped pressure-applying diaphragm area, which applies pressure to the area of the MTM, combined with a non-pressure applying area in the central regions of the FCM where capillaries are closely spaced.

Deposition chip 108 can be aligned and bonded to FCM 114 via the barrier material 112 in a manner similar to that known for bonding of polyimide sheets containing orifices in the inkjet industry.

In the first embodiment of the invention as shown in FIG. 1 and FIG. 2, the optional neck 106 in reservoir 102 is typically not needed. In the second embodiment referred to above in which the MTM and the rim are combined in a unitary body, neck portion 106 of reservoir 102 should typically be present in order to prevent layer 118 from intruding into reservoir 102 during lamination before it has a chance to bond to layer 116.

Figure 3:
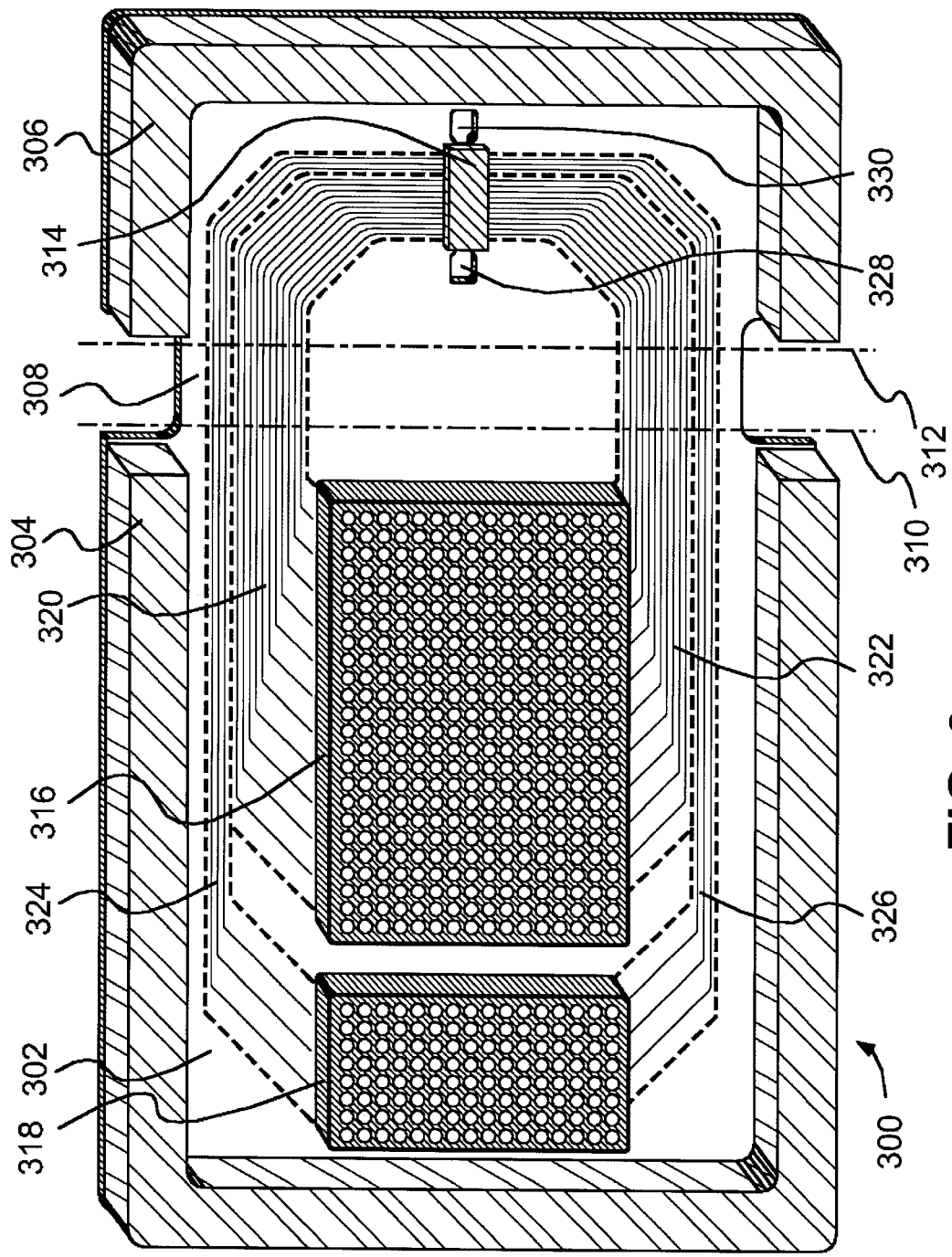
FIG. 3 is an isometric view of the fluid handling system of another embodiment of the present invention.

Referring now to FIG. 3, therein is shown another embodiment of a fluid handling system 300 of the present invention in which a FCM 302 is stretched on two independent rim portions. The rim 303 is split into two independent rigid portions 304 and 306, each laminated to a portion of the FCM 302. A section 308 of the FCM 302 between indication lines 310 and 312 is freed from the rim 303 and is neither stretched nor taut, because no critical requirement for tautness or dimensional stability exists for the section 308. However, the deposition chip 314 is still on a flat and taut section of the FCM 302, and the two microtiter manifolds 316 and 318 are on a different flat and taut section of the FCM 302. The FCM 302 can be flexed at the section 308, for example to allow deposition chip 314 to be in a different plane than microtiter manifolds 316 and 318.

In the fluid handling system 300, MTM 316 contains three hundred eighty four (384) separate reservoirs on 4.5 mm centers, which matches the spacing of a standard 384-well microtiter plate. MTM 318 contains one hundred twenty eight (128) separate reservoirs, also on 4.5 mm centers. Capillary bus regions 320 and 322 each contain one hundred ninety two (192) separate capillaries lying within FCM 302 which open beneath the reservoirs of MTM 316 and feed three hundred eighty four (384) separate firing chambers, not shown, near the edges of the far side of deposition chip 314.

Likewise, capillary bus regions 324 and 326 each contain sixty four (64) separate capillaries lying within FCM 302 which open beneath the reservoirs of MTM 318 and feed one hundred twenty eight (128) separate firing chambers (not shown) near the edges of the far side of deposition chip 314.

Holes 328 and 330 extend through FCM 302 and allow electrical flex leads, not shown, to contact bonding pads (not shown) on the far side of deposition chip 314.

Thus, the fluid handling system 300 is capable of handling five hundred twelve (512) separate samples simultaneously.

The fluid handling system 300 may be fabricated by laminating the layers of the FCM 302 together and simultaneously laminating one surface of the FCM 302 to a single rigid frame. The single rigid frame can then be split into independent portions 304 and 306 by sawing or milling. Alternatively, portions 304 and 306 can be independent before lamination occurs and may be laminated to FCM 302 using proper fixturing, which will be evident to one skilled in the art.

In the embodiments discussed above the deposition chip is typically an integrated circuit fluidic microsystem as typified by a modified inkjet printing chip in which multiple fluid handling sites are arranged on one substrate and connected to multiple electrical leads. Such a system may incorporate an electrically inert substrate such as a glass substrate or a silicon substrate in which there are resistors but no transistors, or it may incorporate an electrically active substrate containing both resistors and transistors. It is not a requirement of the invention that the deposition chip be contained in a unitary substrate, but instead the deposition chip may comprise a system built up from multiple parts with may extend some distance from the liquid ejection sites in directions parallel to and perpendicular to the major surfaces of the flexible manifold. Further, it is not a requirement of the invention that liquid deposition be accomplished by an integrated circuit fluidic microsystem, but instead some combination of separate systems may be used for liquid deposition.

The invention has been described with reference to a specific application, that of depositing droplets of liquid upon a substrate, with embodiments that include reservoirs for liquid input and ejection means for liquid output. However, the invention may be used for other applications, for example capillary zone electrophoresis in which samples to be analyzed are injected from one or more reservoirs into one or more capillary channels and separated by electric fields into component species. In such an application, no liquid need be ejected from the invention, but rather liquid may flow into an output reservoir similar in structure to the input reservoirs described above and remain in contact with the flexible manifold for later extraction by external means or for disposal. Also in such an application there may be a use for electrodes included in the flexible manifold structure during the lamination process. Such electrodes or their lamination will be evident to those skilled in the art in light of the teachings herein.

Fluid access to a capillary via one or more holes accessing the capillary has been disclosed herein. However, if the capillary is formed by first forming a trench which extends to an edge of one of the sheets to be laminated, then laminating two sheets together so that the trench is converted to an open capillary extending to an edge of a sheet, there may be no need to form a separate access hole.

Holes extending through one or the other sheet in the flexible manifold have been discussed herein, and for illustrative purposes such holes have been considered to be formed before lamination of the first sheet to the second sheet. However, such holes can also be formed after lamination of the two sheets.

Holes extending through the flexible manifold have been discussed herein for the purpose of allowing solid objects such as electrical leads or alignment pins to extend therethrough. It will be evident to those skilled in the art that such holes extending through the flexible manifold can be employed for other purposes including but not limited to optical alignment, passage of fluids, and the passing therethrough of rigid or flexible tubular channels for carrying gases and liquids from one side of the flexible manifold to the other. It will be evident that such holes can be formed before or after lamination.

The embodiments discussed above have illustrated liquid reservoirs which provide liquid inlets to one side of the flexible manifold and ejection means which eject liquid from the opposite side of the manifold, but it is not a requirement of the invention that inlets and outlets be on opposite sides of the manifold, and such inlets and outlets can be on either or both sides of the manifold. Nor is it a requirement of the invention that reservoirs contain liquid. Reservoirs consistent with the spirit and purpose of then invention may contain liquid, gas, plasma, or a suspension of powder in a liquid or a gas.

The embodiments discussed above have illustrated one fluid inlet hole connected to each capillary and one outlet hole connected to each capillary, but this is not a requirement of the invention. Two or more inlet holes can be connected to each capillary, for example to allow mixing of two different liquids for purposes of injection, reaction, or mixing. Two or more outlet holes can be connected to each capillary, for example to provide one fluid to multiple ejection sites for purposes of redundancy.

The embodiments discussed above have illustrated simple unbranched capillaries, but this is not a requirement of the invention. A capillary included in the invention can be branched, for example to allow multiple fluids to be input to the capillary or to allow one fluid to be carried to multiple outlet points.

Specific polymers of interest for use in the flexible manifold of the invention include, but are not limited to, polyimides, polyketones, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substitutional and unsubstituted polyolefins, and copolymers thereof.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters hither-to-fore set forth or shown in the accompanying drawings are to be interpreted in an illustrative and non-limiting sense.

The invention claimed is:

1. A method of manufacturing a fluid handling system, comprising
   providing first and second sheets of respective first and second flexible materials;
   forming a trench in a surface of one of the first sheet and the second sheet;
   providing a rigid rim;
   laminating the second sheet to the rigid rim while laminating the first sheet to the second sheet to form a composite laminated sheet in a state of tensile stress on the rim, the composite laminated sheet having the trench located at the interface between the first sheet and the second sheet wherein the trench is converted into a covered capillary by the process of laminating the first sheet to the second sheet.

2. The method as claimed in claim 1 including forming a hole through at least one of the first sheet and the second sheet, wherein the hole provides fluid access to the covered capillary.

3. The method as claimed in claim 1 including providing a structure having a fluid reservoir provided therein and placing the fluid reservoir in fluid connection with the covered capillary via a hole through at least one of the first and second sheets.

4. The method as claimed in claim 1 including providing a liquid ejection device and placing the liquid ejection device in fluid connection with the covered capillary via a hole through at least one of the first and second sheets.

5. The method as claimed in claim 1 including forming a liquid ejection orifice in at least one of the first sheet and the second sheet.

6. The method as claimed in claim 1 including forming liquid ejection orifices in the first sheet and second sheets prior to laminating the second sheet to the rigid rim.

7. The method as claimed in claim 1 wherein forming the trench uses laser ablation.

8. The method as claimed in claim 2 wherein forming the hole uses laser ablation.

9. The method as claimed in claim 1 wherein providing the first and second sheets provides one sheet of a flexible material selected from a group consisting of polyimides, polyketones, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substitutional and unsubstituted polyolefins, and copolymers thereof.

10. The method as claimed in claim 1 wherein providing the first and second sheets provides one sheet having a surface layer of adhesive selected from a group consisting of polyimides, polyketones, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substitutional and unsubstituted polyolefins, and copolymers thereof.

11. The method as claimed in claim 2 including forming an additional hole through the first and second sheets.

12. The method as claimed in claim 11 including providing a solid object and passing the solid object through the additional hole.

13. The method as claimed in claim 12 wherein the solid object is selected from a group consisting of an electrical lead, an alignment pin, a tubular channel, and a combination thereof.

14. A fluid handling system comprising:
   a flexible manifold including two layers of flexible material laminated together, the flexible manifold having provided therein a covered capillary; and
   a peripheral rim attached to the flexible manifold and exerting tensile stress on the flexible manifold to provide dimensional stability to the flexible manifold.

15. The system as claimed in claim 14 including a fluid access hole connected to the covered capillary.

16. The system as claimed in claim 14 wherein one layer of the flexible material is selected from a group consisting of polyimides, polyketones, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substitutional and unsubstituted polyolefins, and copolymers thereof.

17. The system as claimed in claim 14 wherein one layer of the flexible material has a surface layer of adhesive selected from a group consisting of polyimides, polyketones, polycarbonates, polyesters, polyamides, polyethers, polyurethanes, polyfluorocarbons, polystyrenes, poly(acrylonitrile-butadiene-styrene)(ABS), acrylate and acrylic acid polymers such as polymethyl methacrylate, and other substitutional and unsubstituted polyolefins, and copolymers thereof.

18. The system as claimed in claim 14 including liquid deposition means attached to the flexible manifold.

19. The system as claimed in claim 18 wherein the liquid deposition means is an integrated circuit fluidic microsystem.

20. The system as claimed in claim 19 wherein the integrated circuit fluidic microsystem includes a device selected from a group consisting of thermally actuated and piezoelectrically actuated devices to eject liquid droplets.

21. The system as claimed in claim 19 wherein the liquid deposition means is fluidically connected to a capillary outlet hole extending through at least one of the first and second sheets.

22. The system as claimed in claim 19 wherein the flexible manifold has a plurality of capillaries and a plurality of capillary outlet holes provided therein and the liquid deposition means is fluidically connected to the plurality of capillary outlet holes.

23. The system as claimed in claim 22 wherein adjacent capillary outlet holes have a spacing selected from a group consisting of less than two hundred micrometers and less than one hundred micrometers.

24. The system as claimed in claim 15 wherein the flexible manifold has a plurality of capillary inlet holes, a plurality of capillary outlet holes, and a plurality of fluid paths provided therein, the plurality of fluid paths disposed among the plurality of capillary inlet holes and the plurality of capillary outlet holes.

25. The system as claimed in claim 24 wherein the plurality of fluid paths provides a change in format spacing of separate fluids between the plurality of capillary inlet holes and the plurality of capillary outlet holes.

26. The system as claimed in claim 25 wherein the change in format spacing provides a format compression ratio selected from a group consisting of 25 and greater, 50 and greater, 100 and greater, and 200 and greater.

27. The system as claimed in claim 15 wherein the flexible manifold has a plurality of capillary inlet holes provided therein and including a reservoir substrate attached to the flexible manifold and having a plurality of reservoirs provided therein.

28. The system as claimed in claim 27 wherein the plurality of reservoirs is connected to the plurality of capillary inlet holes.

29. The system as claimed in claim 27 wherein the reservoir substrate is attached to the flexible manifold by means selected from a group consisting of adhesive means, clamping means, and a combination thereof.

30. The system as claimed in claim 27 wherein the flexible manifold has a plurality of capillary inlet holes provided therein and the plurality of reservoirs are connected to the plurality of capillary inlet holes.

31. The system as claimed in claim 14 wherein the flexible manifold has a hole therethrough.

32. The system as claimed in claim 31 including a solid object extending through the hole.

33. The system as claimed in claim 32 wherein the solid object is selected from a group consisting of an electrical lead, an alignment pin, a tubular channel, and a combination thereof.

* * * * *